United States Patent
Vetters (10) Patent No.: US 10,132,194 B2
(45) Date of Patent: Nov. 20, 2018

(54) SEAL SEGMENT LOW PRESSURE COOLING PROTECTION SYSTEM

(71) Applicant: Rolls-Royce North American Technologies, Inc., Indianapolis, IN (US)

(72) Inventor: Daniel K. Vetters, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 329 days.

(21) Appl. No.: 14/970,748

(22) Filed: Dec. 16, 2015

(65) Prior Publication Data

US 2017/0175572 A1    Jun. 22, 2017

(51) Int. Cl.
F01D 25/12    (2006.01)

(52) U.S. Cl.
CPC .......... *F01D 25/12* (2013.01); *F05D 2240/11* (2013.01); *F05D 2260/201* (2013.01); *F05D 2300/6033* (2013.01)

(58) Field of Classification Search
CPC ... F01D 9/06; F01D 9/02; F01D 17/14; F01D 25/12; F01D 25/14; F05D 2220/32; F05D 2240/11; F05D 2240/128; F05D 2260/201; F05D 2300/6033
See application file for complete search history.

(56) References Cited

U.S. PATENT DOCUMENTS

| | | |
|---|---|---|
| 678,653 A | 7/1901 | Gaede et al. |
| 6,884,026 B2 | 4/2005 | Glynn et al. |
| 6,899,518 B2 | 5/2005 | Lucas et al. |
| 7,011,493 B2 * | 3/2006 | Marchi ..................... F01D 9/04 415/116 |
| 7,306,424 B2 | 12/2007 | Romanov et al. |
| 7,641,440 B2 | 1/2010 | Morrison et al. |
| 7,670,108 B2 | 3/2010 | Liang |
| 7,726,936 B2 | 6/2010 | Keller et al. |
| 8,529,201 B2 | 9/2013 | Lutjen et al. |
| 8,550,778 B2 | 10/2013 | Koyabu et al. |
| 8,727,704 B2 | 5/2014 | Lee et al. |
| 8,898,565 B2 | 11/2014 | Schroeter et al. |
| 8,998,565 B2 | 4/2015 | Foster et al. |
| 2001/0046441 A1 * | 11/2001 | Mashey ..................... F01D 5/06 416/96 R |
| 2005/0129499 A1 * | 6/2005 | Morris ..................... F01D 9/04 415/1 |
| 2013/0011238 A1 | 1/2013 | Liang et al. |
| 2014/0023490 A1 * | 1/2014 | Hillier ..................... F01D 11/005 415/173.6 |

* cited by examiner

*Primary Examiner* — Logan Kraft
*Assistant Examiner* — Justin A Pruitt
(74) *Attorney, Agent, or Firm* — Barnes & Thornburg LLP (57) ABSTRACT

A turbine shroud adapted for use in a gas turbine engine includes a plurality of metallic carrier segments and a plurality of blade track segments mounted to corresponding metallic carrier segments. Cooling flow inserts direct cooling air onto the blade track segments to cool the blade track segments when exposed to high temperatures in a gas turbine engine.

18 Claims, 7 Drawing Sheets

SEAL SEGMENT LOW PRESSURE COOLING PROTECTION SYSTEM

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds are sometimes positioned in a turbine section of the engine. Thus, the shrouds contact high temperature products discharged from the combustor and may require cooling.

SUMMARY

The present application discloses one or more of the features recited in the appended claims and/or the following features which, alone or in any combination, may comprise patentable subject matter.

According to the present disclosure, a turbine shroud may include a plurality of carrier segments, a plurality of blade track segments, and a plurality of thin-walled tubes. The carrier segments may comprise metallic material and be arranged circumferentially adjacent to one another around an axis. The blade track segments may comprise ceramic-matrix composite material and be arranged circumferentially adjacent to one another around the axis. Each blade track segment may be coupled to one of the carrier segments.

In illustrative embodiments, each thin-walled tube may define an internal cooling air plenum and extend into one of the carrier segments. Each thin-walled tube may be configured to direct a flow of cooling air toward a radially-outward facing side of the blade track segment.

In illustrative embodiments, each carrier segment may be formed to include a tube receiver configured to receive one of the thin-walled tubes to hold the thin-walled tube in place relative to the carrier segment.

In illustrative embodiments, the turbine shroud may further include a head coupled to one end of each thin-walled tube, a foot coupled to an opposing end of each thin-walled tube from the head, and a spacer platform positioned between the head and foot and extending away from an exterior surface of each thin-walled tube.

In illustrative embodiments, the head, foot, and spacer platform may be configured to seal against the tube receiver and space the thin-walled tube from an interior surface of the tube receiver.

In illustrative embodiments, an impingement hole may be formed through the spacer platform of each thin-walled tube and may be configured to direct the flow of cooling air from the internal cooling air plenum toward the radially-outward facing side of the blade track segment at an angle relative to the radially-outward facing side such that the flow of cooling air is not normal to the radially-outward facing side.

In illustrative embodiments, an impingement hole may be formed through the spacer platform of each thin-walled tube and may be configured to direct the flow of cooling air from the internal cooling air plenum toward the radially-outward facing side of the blade track segment such that the flow of cooling air is generally normal to the radially-outward facing side.

In illustrative embodiments, the turbine shroud may further include a plurality of track-segment couplers. Each track-track segment coupler may be coupled to one of the carrier segments and configured to hold one of the blade track segments on the carrier segment.

In illustrative embodiments, each track-segment coupler may be configured to receive one of the thin-walled tubes to hold the thin-walled tube in place relative to the carrier segment.

In illustrative embodiments, the turbine shroud may further include a first spacer platform extending away from an exterior surface of the thin-walled tube at an outer end thereof and a second spacer platform extending away from an exterior surface of the thin-walled tube at an outer end thereof.

In illustrative embodiments, an inlet may be formed through the first spacer platform and may be configured to direct the flow of cooling air into the internal cooling air plenum. An outlet may be formed through the second spacer platform and may be configured to direct the flow of cooling air out of the internal cooling air plenum toward the radially-outward facing side of the blade track segment.

In illustrative embodiments, each blade track segment may include a runner and a bridge extending radially outward from and circumferentially along the runner to define an internal cooling cavity between the bridge and the runner.

In illustrative embodiments, the turbine shroud may further include a plurality of flow distributors. Each flow distributor may be configured to direct the flow of cooling air toward the radially-outward facing side of one of the blade track segment and extend into the internal cooling cavity of the blade track segment.

In illustrative embodiments, each track-segment coupler may be configured to engage with one of the flow distributors to hold one of the blade track segments on one of the carrier segments.

In illustrative embodiments, each blade track segment may include a runner and at least two attachment features extending radially outward from the runner. The at least two attachment features may be circumferentially spaced apart from one another and axially extend along the runner.

In illustrative embodiments, each thin-walled tube may be positioned between the at least two attachment features of a corresponding blade track segment.

According to the present disclosure, a turbine shroud segment for use in a gas turbine engine may include a carrier segment, a blade track segment coupled to the carrier segment, and an thin-walled tube. The carrier segment may be formed to define an internal cavity. The blade track segment may be coupled to the carrier segment to cover an opening into the internal cavity. The impingement tube may extend into the internal cavity and may be configured to direct a flow of cooling air toward a side of the blade track segment that faces the internal cavity.

In illustrative embodiments, the thin-walled tube may define an internal cooling air plenum.

In illustrative embodiments, the turbine shroud segment may further include a head coupled to one end of each thin-walled tube, a foot coupled to an opposing end of each thin-walled tube from the head, and a spacer platform positioned between the head and foot and extending away from an exterior surface of each thin-walled tube. The carrier segment may be formed to include a tube receiver configured to receive the thin-walled tube to hold the thin-walled tube in place relative to the carrier segment. The head, foot, and spacer platform may be configured to seal against the tube receiver and space the thin-walled tube from an interior surface of the tube receiver.

In illustrative embodiments, the blade track segment may include an arcuate runner that extends partway around an axis and at least two attachment posts extending radially outward from the runner into the internal cavity away from the axis. The at least two attachment posts may be circumferentially spaced apart from one another around the axis and axially extend along the axis. Each cooling flow insert may extend axially along the axis into the internal cavity between the at least two attachment posts of the blade track segment.

In illustrative embodiments, the turbine shroud segment may further include a track-segment coupler and a flow distributor. Each blade track segment may include a runner and a bridge extending radially outward from and circumferentially along the runner to define an internal cooling cavity between the bridge and the runner. The flow distributor may be configured to direct the flow of cooling air toward the side of one of the blade track segment facing the internal cavity of the carrier segment and extend into the internal cooling cavity of the blade track segment. The track-segment coupler may be configured to engage with the flow distributor to hold the blade track segment on the carrier segment.

In illustrative embodiments, the turbine shroud segment may further include a first spacer platform extending away from an exterior surface of the thin-walled tube at an outer end thereof and a second spacer platform extending away from an exterior surface of the thin-walled tube at an outer end thereof. The track-segment coupler may be configured to receive the thin-walled tube to hold the thin-walled tube in place relative to the carrier segment. An inlet may be formed through the first spacer platform and may be configured to direct the flow of cooling air into the internal cooling air plenum. An outlet may be formed through the second spacer platform and may be configured to direct the flow of cooling air out of the internal cooling air plenum to the flow distributor.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
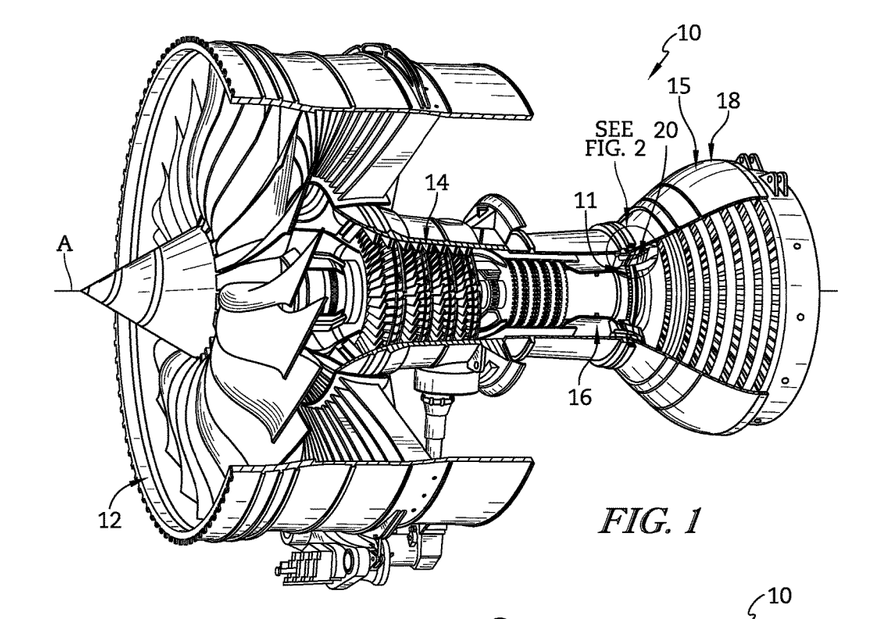
FIG. 1 is a cut-away perspective view of a gas turbine engine showing that the engine includes a fan, a compressor, a combustor, and a turbine, the turbine including a turbine shroud in accordance with the present disclosure positioned radially outward from blades of a turbine wheel assembly as shown in FIGS. 2 and 3.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
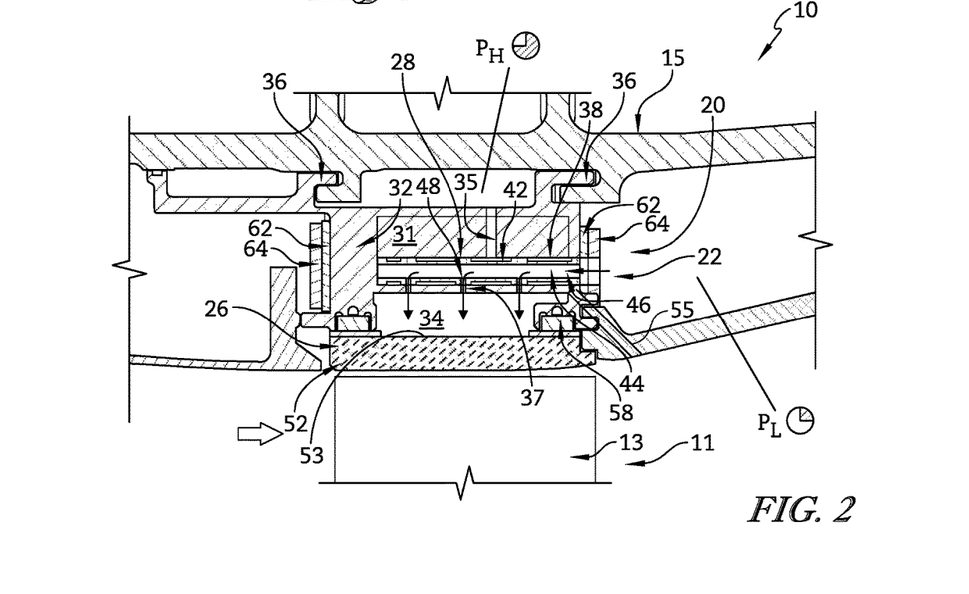
FIG. 2 is a partial sectional view of the gas turbine engine of FIG. 1 showing that the turbine shroud includes a carrier, a blade track coupled to the carrier, and a plurality of thin-walled cooling flow inserts extending into the carrier and suggesting that low-pressure ($P_L$) cooling air flows through the cooling flow inserts and is directed toward the blade track to cool the blade track while dead-headed high-pressure air ($P_H$) is directed in to the carrier to surround the cooling flow inserts.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11. The blades 13 are in turn pushed by the combustion products to cause the turbine wheel assembly 11 to rotate; thereby, driving the rotating components of the compressor 14 and/or the fan 12.

Figure 3:
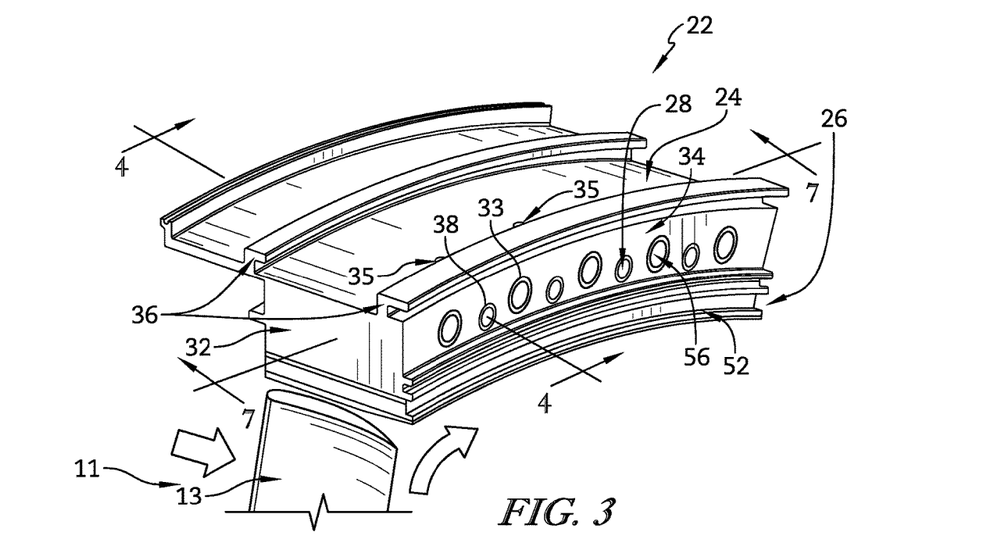
FIG. 3 is a perspective view of a shroud segment of the turbine shroud of FIG. 2 showing that the shroud segment includes a carrier segment, a blade track segment coupled to the carrier segment, and a plurality of cooling flow inserts coupled to the carrier segment and suggesting that hot gasses pass over the blades of the turbine wheel to rotate the turbine wheel and that the blades pass along the blade track segment as the turbine wheel rotates.

The turbine shroud 20 extends around the turbine wheel assembly 11 to block combustion products from passing over the blades 13 without pushing the blades 13 to rotate as suggested in FIGS. 2 and 3. In the illustrative embodiment, the turbine shroud 20 is made up of a number of shroud segments 22, one of which is shown in FIG. 3, that extend only part-way around the central axis A and cooperate to surround the turbine wheel assembly 11. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a blade track segment 26, and one or more cooling flow inserts 28 as shown in FIG. 2. The carrier segment 24 is configured to support the blade track segment 26 in position adjacent to the blades 13 of the turbine wheel assembly 11. The blade track segment 26 is generally concentric with and nested into the carrier segment 24 along the central axis A of the gas turbine engine 10. The cooling flow inserts 28 are coupled to the carrier segment 24 and configured to direct a flow of low-pressure cooling air ($P_L$) toward a radially-outward facing side, hereinafter referred to as a backside 53 of the blade track segment 26.

The cooling flow inserts 28 are part of a low-pressure cooling system of the engine 10 and are configured to minimize leakage of hot, high-pressure gases into the low-pressure cooling system as further detailed below. In some embodiments, interstage 'bleed' air is used to supply the flow of cooling air. Using interstage 'bleed' air to cool the turbine shroud segments 22 may provide a reduction in engine Specific Fuel Consumption (SFC), in that there is less work in producing interstage compressor air compared to compressor discharge air. Interstage compressor bleed air is also lower pressure, cooler, and less parasitic than compressor discharge air when used to cool the blade track segments 26. For example, the low-pressure cooling air may be at a lower pressure than the gas path air at the front of the turbine section where the shroud 20 is located, but at a higher pressure than the gas path air behind the turbine section after work has been done on the turbine wheel 11.

Figure 4:
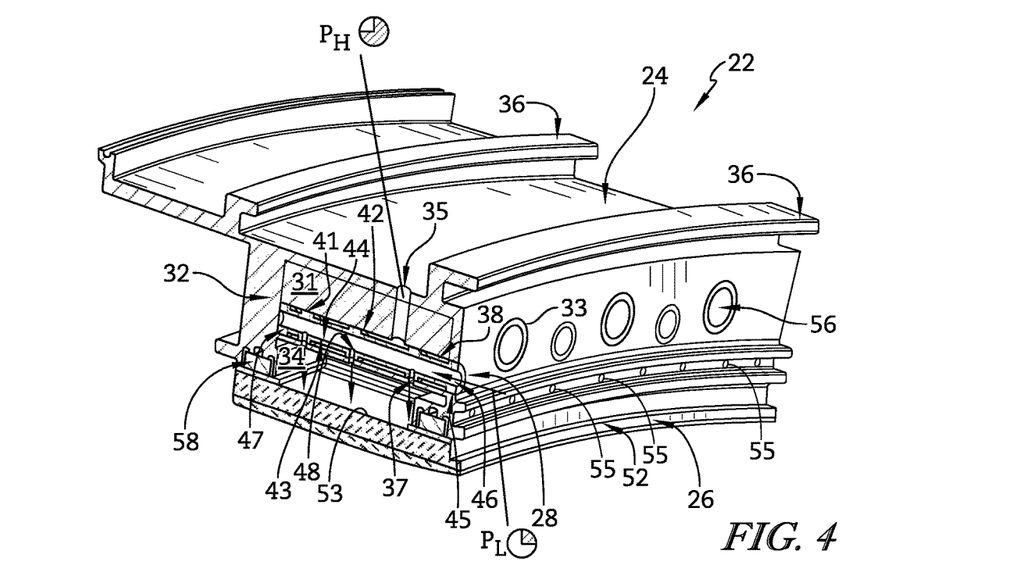
FIG. 4 is a perspective sectional view taken along line 4-4 in FIG. 3 showing the cooling flow inserts extend axially into the carrier segment and are spaced circumferentially from one another to direct the flow of cooling air along a backside of the blade track segment and suggesting that high-pressure air is passed through a high-pressure inlet to surround the cooling flow inserts but does not pass through the cooling flow insert while the cooling flow insert is intact and sealed against the carrier segment.

In the illustrative embodiment, each of the carrier segments 24 includes a body 32 formed to define a cavity 34 and case hangers 36 coupled to the body 32 as suggested in FIGS. 3 and 4. The case hangers 36 are spaced apart from one another and couple the carrier segments 24 to the outer case 15 of the engine 10 as shown in FIG. 2. The cooling flow inserts 28 extend through the body 32 and are configured to pass the flow of cooling air into the cavity 34 as suggested in FIG. 4.

Figure 5:
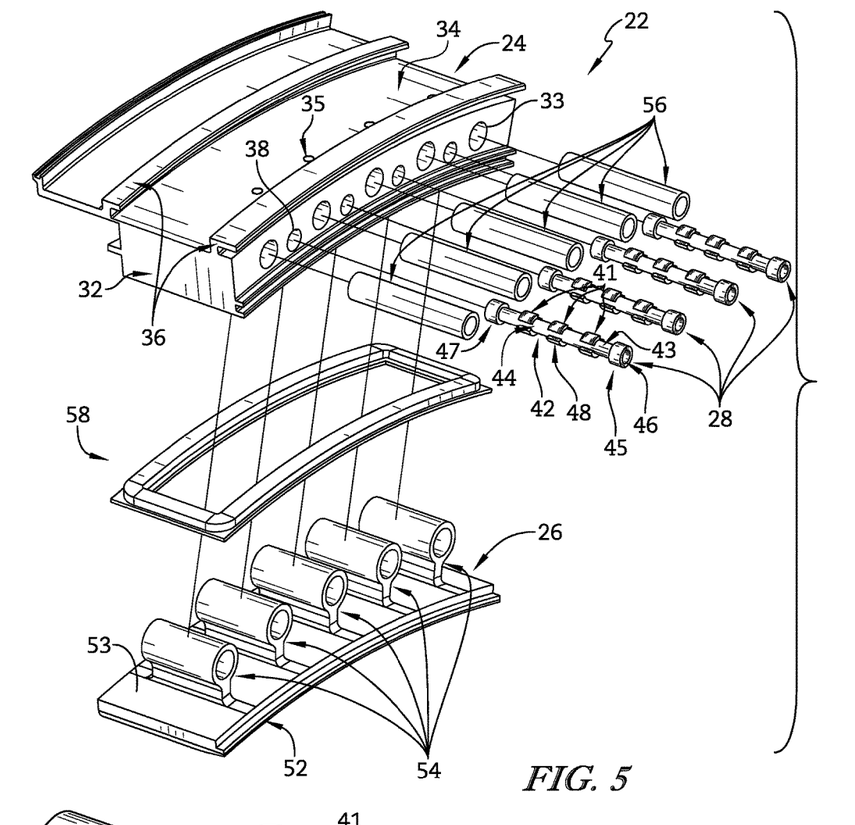
FIG. 5 is an exploded perspective view of the shroud segment of FIG. 3 showing that the blade track segment includes a runner and a plurality of attachment posts extending radially outward from the runner and suggesting that the attachment posts extend into the carrier segment and that attachment pins extend into the carrier segment and attachment posts to hold the blade track segment to the carrier segment.

Each blade track segment 26 includes a runner 52 defining the backside 53 and a plurality of attachment posts 54 extending radially outward from the runner 52 as shown in FIG. 5. While five attachment posts 54 are shown, more or less attachment posts may be used to hold the blade track segment 26 to the carrier segment 24. The attachment posts 54 are configured to extend into the cavity 34 of the carrier segment 24 and receive attachment pins 56 to hold the blade track segment 26 to the carrier segment.

In the illustrative embodiment, a seal member 58 is positioned between the backside 53 of the runner and the body 32 of the carrier segment 24 to seal the cavity 34 as suggested in FIG. 5. The seal member 58 creates a continuous seal along a perimeter edge of the runner 52. The attachment pins 56 extend through pin receivers 33 of the carrier segment 24 and through the attachment posts 54 to align the blade track segment 26 with the carrier segment 24 and hold the runner 52 against the seal member 58 as suggested in FIG. 7. The runner 52 is configured to block hot gasses from passing over the blades 13 without interacting with the blades 13 when the shroud segments 22 are coupled to the outer case 15 as suggested in FIG. 2.

Figure 6:
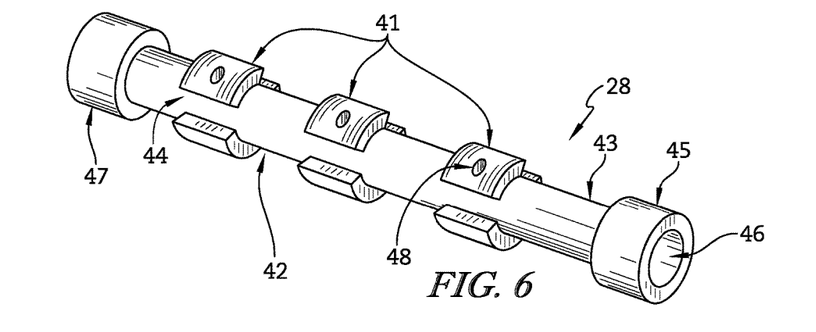
FIG. 6 is an enlarged view of an cooling flow insert of FIG. 5 showing that the cooling flow inserts each include a thin wall, a head and a foot coupled to opposing ends of the thin wall, and a plurality of spacer platforms coupled to the thin wall and suggesting that the flow of cooling air enters through an opening formed through the head and is directed toward the blade track segment by impingement holes formed in at least some of the spacer platforms to cool the blade track segment.

Each of the cooling flow inserts 28 includes an elongated body 42 defining a cooling air plenum 44 therein, a head 45 coupled to one end of the body 42 and defining an opening 46 extending into the cooling air plenum 44, and a foot 47 coupled to an opposing end of the body 42 from the head 45 as suggested in FIG. 6. The head 45 and foot 47 extend around the body 42 and away from an exterior surface thereof. The elongated body 42 includes a thin-walled tube 43 extending between the head 45 and foot 47 and a plurality of spacer platforms 41 spaced along the thin-walled tube 43. In the illustrative embodiment, the thin-walled tube 43 is cylindrical. The spacer platforms 41 are axially and circumferentially spaced from one another and extend at least partially around the thin-walled tube 43 and away from an exterior surface thereof. Impingement holes 48 are formed through at least some of the spacer platforms 41 to extend into the cooling air plenum 44. While nine spacer platforms are shown, more or less spacer platforms may be used. In the illustrative embodiment, the cooling air plenum 44 extends through the cooling air insert 28 and provides pressure balancing across the cooling air insert 28.

Each cooling flow insert 28 extends into a tube receiver 38 formed in the carrier segment 24 as suggested in FIG. 4. Each tube receiver 38 extends axially along the carrier segment 24 between axial end faces of the body 32. The impingement holes 48 of the cooling flow insert 28 are oriented radially inward to align with outlets 37 formed through the tube receiver 38. In the illustrative embodiment, the head 45, foot 47, and spacer platforms 41 of the cooling flow insert 28 are sealed against the tube receiver 38. In some embodiments, the cooling flow insert 28 is brazed in place relative to the tube receiver 38 to seal the tube 28 against the tube receiver 38. The head 45, foot 47, and spacer platform 41 are each configured to space the thin-walled tube 43 from an interior surface of the tube receiver 38. In some embodiments, there is no foot 47 and the thin-walled tube 43 nests into a stepped bore of the tube receiver 38.

The flow of low-pressure cooling air enters through the opening 46 and is directed toward the blade track segment 26 by the impingement holes 48 and outlets 37 to cool the blade track segment 26 as suggested in FIG. 4. In some embodiments, cooling air discharge ports 55 may be formed in the carrier segments 24 along a trailing edge side of the shroud segments 22 to allow the cooling air to escape from the cavity 34 and rejoin a primary gas path through the engine 10 as suggested in FIGS. 2 and 4. In other embodiments, the discharge ports may be formed through the seal member 58 or the blade track segment 26 along the trailing edge of the shroud segments 22.

Dead-headed high-pressure air ($P_H$) is fed through one or more high-pressure inlets 35 to fill the tube receiver 38 and surround the thin-walled tube 43 of the cooling flow insert 28 as suggested in FIG. 4. During normal operation of engine 10, the high-pressure air is blocked from entering the cooling flow insert 28 and is dead-headed to minimize the SFC of the engine 10. The thin-walled tube 43 of the cooling flow insert 28 is configured to melt if hot, high-pressure gasses bypass the perimeter seal 58 or pass through the blade track segment 26 into the cavity 34 of the carrier segment 24.

The high-pressure air would then flow through the openings formed by melting of the thin-walled tube 43 to drive the hot gasses back into the flow path through the engine 10 to prevent the hot gasses from entering other portions of the low-pressure cooling system. The high-pressure air is continuously supplied through high-pressure inlet 35 and is at a higher pressure than the hot gasses in the flow path to block entry of the hot gasses into the turbine shroud 20.

In some embodiments, one or more gaskets 62 are coupled to the carrier segment 24 to cover the attachment pins 56 and pin receivers 33 so that the flow of cooling air is blocked from entering the cavity 34 through the pin receivers 33 as suggested in FIG. 2. The gaskets 62 are formed to include openings to allow the flow of cooling air to pass through cooling flow inserts 28. Cover plates 64 are positioned to hold the gaskets 62 against the carrier segments 24.

Figure 7:
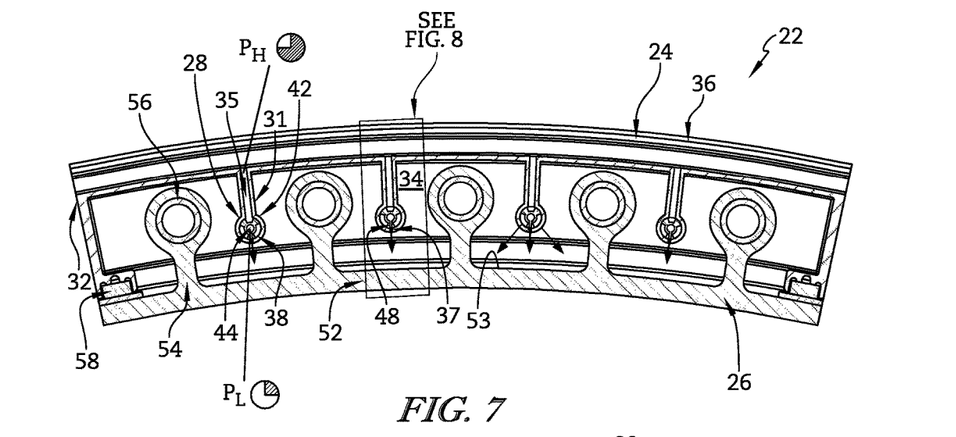
FIG. 7 is a sectional view taken along line 7-7 in FIG. 3 showing that the cooling flow inserts are positioned between adjacent attachment posts of the blade track segment to allow cooling along the blade track segment.

The attachment posts 54 of the blade track segment 26 are spaced apart from one another along the runner 52 as shown in FIG. 7. The cooling flow inserts 28 are circumferentially spaced from one another and positioned between the attachment posts 54 when the shroud segment 22 is assembled. While four cooling flow inserts 28 are shown, more or less cooling flow inserts may be used in the shroud segment 22. In some embodiments, additional cooling flow inserts are positioned between the attachment posts 54 positioned at circumferential ends of the blade track segment 26 and the circumferential end faces of the carrier segment 24.

In the illustrative embodiment, the cooling flow inserts 28 and outlets 37 of the tube receivers 38 are configured to direct the flow of cooling air in a radially inward direction toward the runner 52 of the blade track segment 26 as suggested by the solid arrows in FIG. 7. In some embodiments, the cooling flow inserts 28 and outlets 37 are configured to direct the flow of cooling air toward the runner 52 at an angle relative to the radial direction as suggested by the phantom arrows in FIG. 7. In some embodiments, multiple cooling flow inserts 28 are positioned between adjacent attachment posts 54 of the blade track segment 26.

Figure 8:
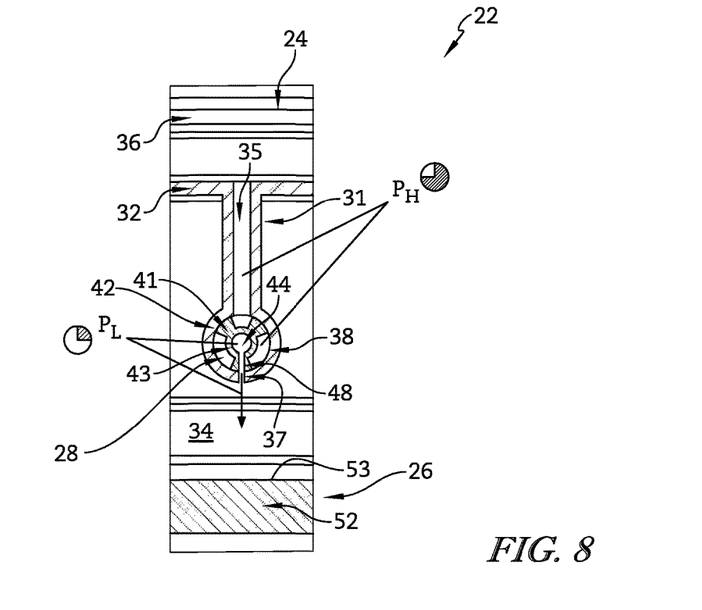
FIG. 8 is an enlarged view of FIG. 7 showing that each cooling flow insert is positioned in a tube receiver formed in the carrier segment and suggesting that the spacer platforms engage with the tube receiver to space the thin wall of the cooling flow insert from the tube receiver to allow high-pressure air to fill the tube receiver and surround the thin wall.

In the illustrative embodiment, ribs 31 extend axially across the body 32 and along the cooling flow inserts 28 to define the high-pressure inlets 35 and support the tube receivers 38 in the internal cavity 34 of the carrier segments 24 as suggested in FIGS. 7 and 8. The spacer platforms 41 of the cooling flow inserts 28 are configured to engage with the tube receivers 38 to space the thin-walled tube 43 from the tube receiver 38. The spacer platforms 41 allow the dead-headed high-pressure air supplied through high-pressure inlet 35 to fill the tube receiver 38 and surround the thin-walled tube 43 as suggested in FIG. 8.

The blade track segments 26 are illustratively formed from ceramic-containing materials as suggested in FIG. 2. In some embodiments, the blade track segments 26 are formed from ceramic-matrix composite materials (particularly silicon-carbide/silicon-carbide ceramic-matrix composite materials). The carrier segments 24 and cooling flow inserts 28 are illustratively formed from metallic materials. The attachment pins 56 are illustratively formed from metallic materials. In some embodiments, the attachment pins 56 are formed from ceramic-containing materials, such as ceramic-matrix composite materials for example.

Figure 9:
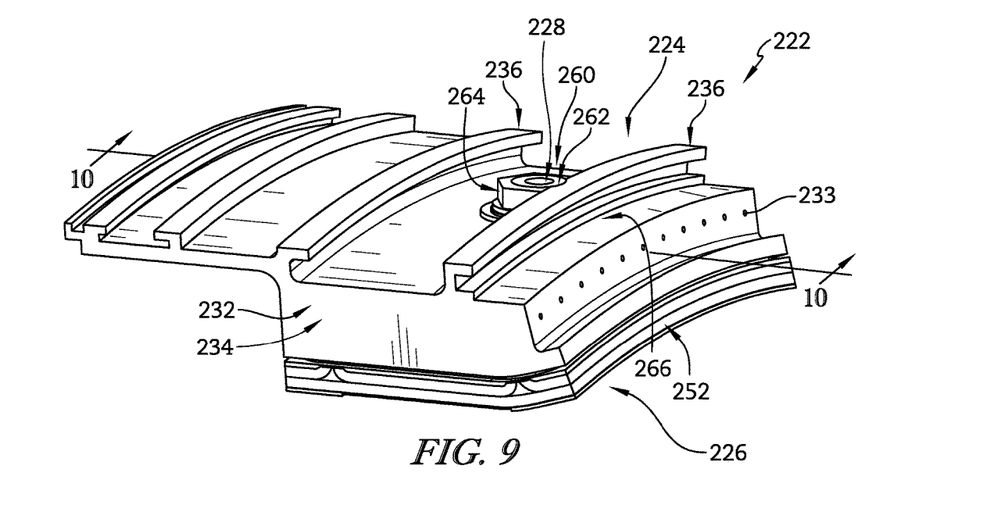
FIG. 9 is a perspective view of another embodiment of a turbine shroud segment in accordance with the present disclosure showing that the shroud segment includes a carrier segment, a blade track segment, and a track-segment coupler positioned to hold the blade track segment on the carrier segment.

Another embodiment of a turbine shroud segment 222 in accordance with the present disclosure for use in a turbine shroud of the gas turbine engine 10 is shown in FIG. 9. Each shroud segment 222 includes a carrier segment 224, a blade track segment 226, and a track-segment coupler 260 as shown in FIG. 9. The carrier segment 224 is configured to support the blade track segment 226 in position adjacent to the blades 13 of the turbine wheel assembly 11. The blade track segment 226 is generally concentric with and nested into the carrier segment 224 along the central axis A of the gas turbine engine 10. The track-segment coupler 260 is coupled to the carrier segment 224 and configured to hold the blade track segment 226 on the carrier segment 224. A cooling flow insert 228 is positioned within the track-segment coupler 260 and configured to direct a flow of low-pressure cooing air ($P_L$) through the shroud segment 222 as suggested in FIG. 10. The cooling flow inserts 228 are part of a low-pressure cooling system of the engine 10 and are configured to minimize leakage of hot, high-pressure gases into the low-pressure cooling system as further detailed below.

In the illustrative embodiment, each of the carrier segments 224 includes a body 232 formed to define a cavity 234 and case hangers 236 coupled to the body 232 as suggested in FIG. 9. The case hangers 236 are spaced apart from one another and couple the carrier segments 224 to the outer case 15 of the engine 10. The track-segment coupler 260 and associated cooling flow insert 228 extend through the body 232 and are configured to pass the flow of low-pressure cooling air received from a port 266 formed through the body 232 into the cavity 234 as suggested in FIG. 10.

Figures 11, 12:
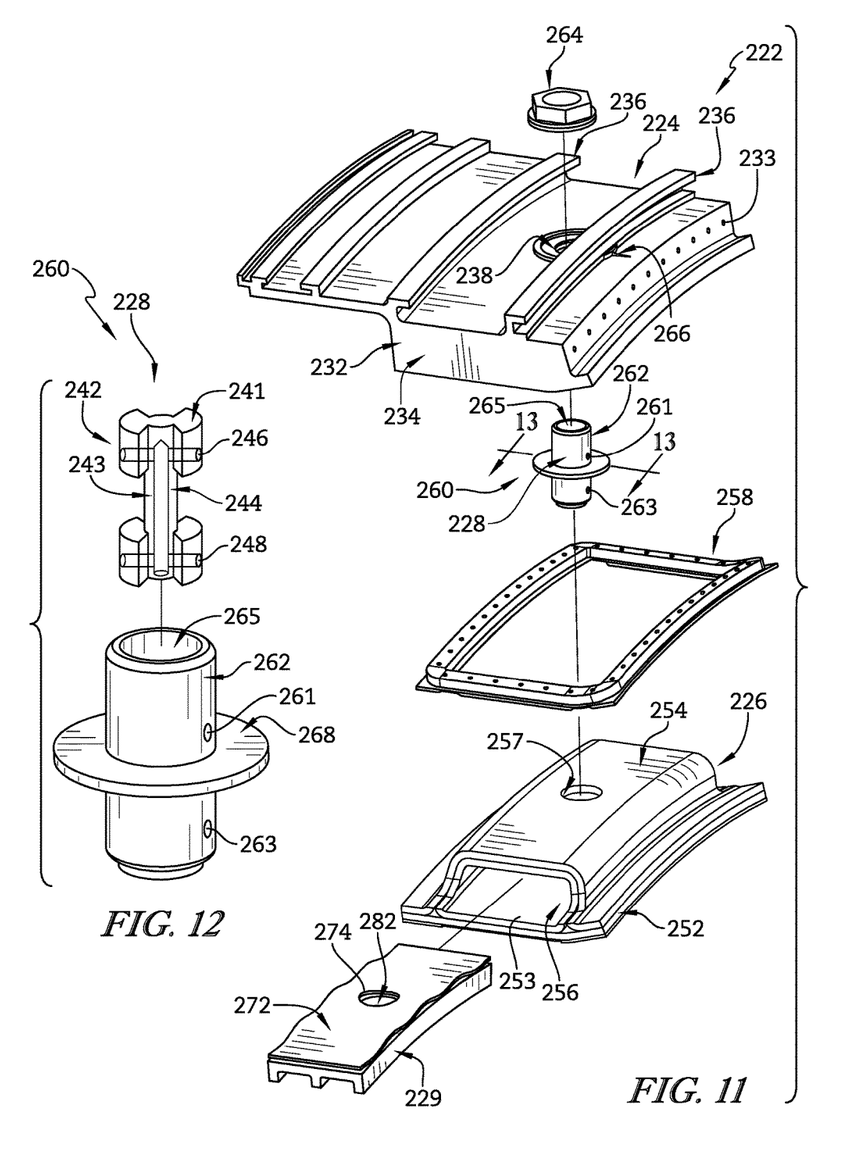
FIG. 11 is an exploded perspective view of the shroud segment of FIG. 10 showing that each blade track segment includes a runner and a bridge coupled to the runner to define an internal cooling cavity and suggesting that the flow distributor is inserted into the internal cooling cavity of the blade track segment and positioned to engage with the support shaft.
FIG. 12 is an exploded perspective view of the support shaft of FIG. 11 showing that the cooling flow insert includes a thin wall and spacer platforms coupled to the thin wall and suggesting that the flow of cooling air enters through an inlet formed through a radially outer spacer platform and exits through an outlet formed through a radially inner spacer platform to direct the flow of cooling air to the flow distributor.

Each blade track segment 226 includes a runner 252 defining a backside 253 of the blade track segment 226 and a bridge 254 extending radially outward from and circumferentially along the runner 252 as shown in FIG. 11. An internal cooling cavity 256 is defined between the bridge 254 and runner 252. A flow distributor 229 is inserted into the internal cooling cavity 256 and engages with the track-segment coupler 260 to hold the blade track segment 226 on the carrier segment 224. The bridge 254 is formed to include an opening 258 sized to receive the track-segment coupler 260 and is configured to extend into the cavity 234 of the carrier segment 224. The runner 252 is configured to block hot gasses from passing over the blades 13 without interacting with the blades 13 when the shroud segments 222 are coupled to the outer case 15. The flow distributor 229 is configured to distribute the flow of cooling air along the backside 253 of the blade track segment 226.

In the illustrative embodiment, a seal member 258 is positioned between the backside 253 of the runner and the body 232 of the carrier segment 224 to seal the cavity 234 as suggested in FIG. 11. The seal member 258 creates a continuous seal along a perimeter edge of the runner 252. The track-segment coupler 260 includes a support shaft 262 and a nut 264. A radially outer portion of the support shaft 262 extends through an opening 238 formed through the body 232 of the carrier segment 224 and engages with the nut 264 to hold the support shaft 262 on the carrier segment 224. In some embodiments, the nut 264 and support shaft 262 engage by a threaded connection, though other connections are possible.

A radially inner portion of the support shaft 262 extends through the opening 257 of the blade track segment 226 and engages with a shaft receiver 282 of the flow distributor 229 to hold the blade track segment 226 on the carrier segment 224 as suggested in FIG. 11. In some embodiments, the support shaft 262 and shaft receiver 282 engage by a threaded connection, though other connections are possible. In the illustrative embodiment, a wave spring 272 is positioned between the flow distributor 229 and bridge 254 of the blade track segment 226 to distribute radial loads placed on the blade track segment 226 and to force the runner 252 against the seal member 258. The support shaft 262 passes through an opening 274 in the wave spring 272 to engage with the flow distributor 229 as suggested in FIG. 11.

Each of the cooling flow inserts 228 includes an elongated body 242 defining a cooling air plenum 244 therein, an inlet 246 extending into the cooling air plenum 244, and an outlet 248 extending out of the cooling air plenum 244 as shown in FIG. 12. The elongated body 242 includes a thin-walled tube 243 and spacer platforms 241 coupled to the thin-walled tube 43 at opposing ends of the elongated body 242. In the illustrative embodiment, the thin-walled tube 243 is cylindrical. The inlet 246 and outlet 248 extend through the spacer platforms 241. In some embodiments, a flange extending around the thin-walled tube 243 is used at the inner end of the cooling air insert 228 in place of the spacer platforms 241.

The support shaft 262 includes an outer opening 261 and an inner opening 263 spaced radially inward of the outer opening 261 as suggested in FIG. 12. A flange 268 extends around a perimeter of the support shaft 262 between the outer and inner openings 261, 263. The cooling flow insert 228 extends into an insert receiver 265 of the support shaft 262 such that the inlet 246 is aligned with the outer opening 261 and the outlet 248 is aligned with the inner opening 263 as suggested in FIG. 13. In the illustrative embodiment, the spacer platforms 241 of the cooling flow insert 228 are sealed against the support shaft 262.

Figure 14:
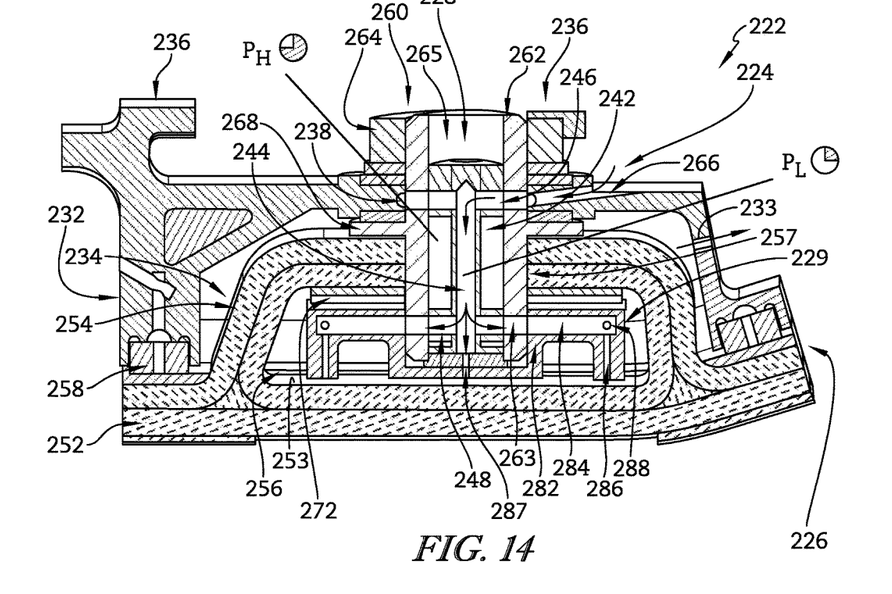
FIG. 14 an enlarged view of the shroud segment of FIG. 10 showing that the support shaft extends through the carrier segment and bridge of the blade track segment to engage with the flow distributor and suggesting that low-pressure cooling air flows through the cooling flow insert while dead-headed high-pressure air fills a space between the cooling flow insert and support shaft but does not pass through the cooling flow insert while the cooling flow insert is intact and sealed against the support shaft.

The flow of low-pressure cooling air enters the port 266 of the carrier segment 224 and into the cooling air plenum 244 of the cooling flow insert 228 through the outer opening 261 and inlet 246 as suggested in FIG. 14. The flow of low-pressure cooling air flows from the cooling air plenum 244 and into the flow distributor 229 through the outlet 248 and inner opening 263. In the illustrative embodiment, a plug 249 is coupled to an inner end of the support shaft 262 and includes an impingement hole 245 aligned with an opening 287 of the flow distributor 229 to allow cooling air to impinge on the blade track segment 226. In some embodiments, the cooling flow insert 228 is sealed against the plug 249. In some embodiments, cooling air discharge ports 233 may be formed in the carrier segments 224 along a trailing edge side of the shroud segments 222 to allow the cooling air to escape from the cavity 234 and rejoin a primary gas path through the engine 10. In other embodiments, the discharge ports may be formed through the seal member 258 or the blade track segment 226 along the trailing edge of the shroud segments 222.

Figure 10:
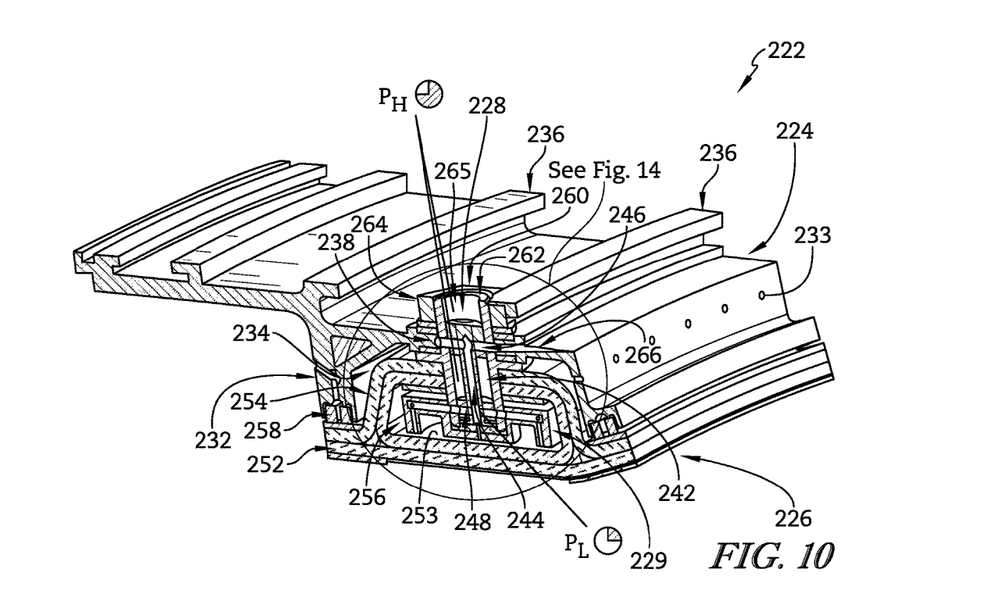
FIG. 10 is a perspective sectional view taken along line 10-10 in FIG. 9 showing that the track-segment coupler includes a support shaft extending through the carrier segment and blade track segment, a nut coupled to the support shaft to hold the support shaft on the carrier segment, and a cooling flow insert positioned within the support shaft and suggesting that the support shaft engages a flow distributor positioned within the blade track segment to hold the blade track segment on the carrier segment and that the cooling flow insert passes a flow of low-pressure cooling air through the support shaft to the flow distributor to impinge on a backside of the blade track segment to cool the blade track segment.

The flow distributor 229 is configured to distribute the flow of low-pressure cooling air along the blade track segment 226 to be impinged on the backside 253 as suggested in FIGS. 10 and 14. The flow distributor 229 includes flow channels 284 formed internally and circumferentially spaced along the flow distributor 229. The flow channels 284 are connected by pass-through ports 288 as suggested in FIG. 14. In the illustrative embodiment, at least some of the flow channels 284 are aligned with the outlet 248 of the cooling flow insert and inner opening 263 of the support shaft 262 to receive the flow of cooling air. A plurality of impingement holes 286 are formed in the flow distributor 229 to direct the flow of cooling air in the flow channels 284 toward the backside 253 of the blade track segment 226. In the illustrative embodiment, the impingement holes 286 are configured to direct the flow of cooling air in a radially inward direction toward the runner 252 of the blade track segment 226. In some embodiments, the impingement holes 286 are configured to direct the flow of cooling air toward the runner 252 at an angle relative to the radial direction.

Figure 13:
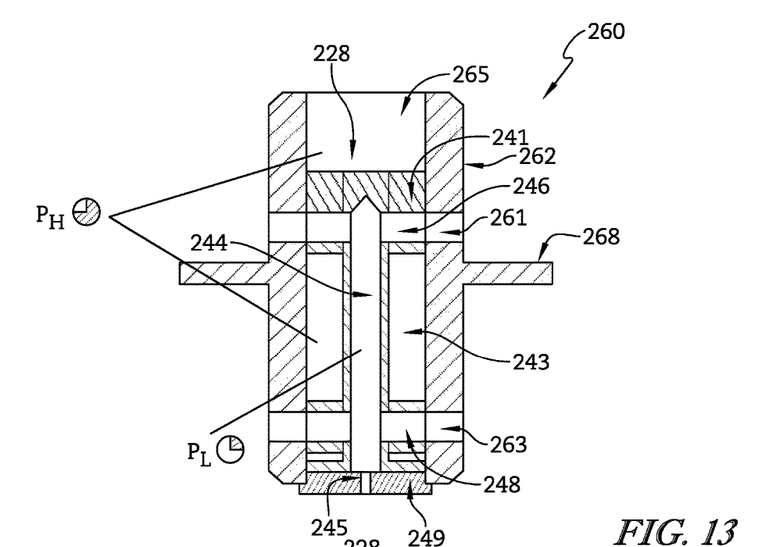
FIG. 13 is a sectional view taken along line 13-13 in FIG. 11 showing that the inlet and outlet of the cooling flow insert are aligned with openings of the support shaft and suggesting that the spacer platforms engage with the support shaft to space the thin wall from the support shaft.

The spacer platforms 241 of the cooling flow inserts 228 are configured to engage with the support shaft 262 to space the thin-walled tube 243 from the interior surface of the insert receiver 265 as suggested in FIGS. 13 and 14. Dead-headed high-pressure air ($P_H$) is fed into support shaft 262 to fill the insert receiver 265 and surround the thin-walled tube 243 of the cooling flow insert 228. During normal operation of engine 10, the high-pressure air is blocked from entering the cooling flow insert 228 and is dead-headed to minimize the SFC of the engine 10 as suggested in FIG. 14. The thin-walled tube 243 of the cooling flow insert 228 is configured to melt if hot, high-pressure gasses bypass the perimeter seal 258 or pass through the blade track segment 226 into the cavity 234 of the carrier segment 224. The high-pressure air would then flow through the openings formed by melting of the thin-walled tube 243 to drive the hot gasses back into the flow path through the engine 10 to prevent the hot gasses from entering other portions of the low-pressure cooling system. The high-pressure air is continuously supplied to the support shaft 262 and is at a higher pressure than the hot gasses in the flow path to block entry of the hot gasses into the turbine shroud segments 222.

In the illustrative embodiment, the flange 268 engages with the body 232 of the carrier segment 224 and cooperated with the nut 264 to hold the support shaft 262 in place relative to the carrier segment 224 as suggested in FIG. 14. In some embodiments, one or more gaskets are coupled between the nut 264 and carrier segment 224 to seal the opening 238. In some embodiments, one or more gaskets are coupled between the flange 268 and carrier segment 224 to seal the opening 238.

The blade track segments 226 are illustratively formed from ceramic-containing materials as suggested in FIG. 14. In some embodiments, the blade track segments 226 are formed from ceramic-matrix composite materials (particularly silicon-carbide/silicon-carbide ceramic-matrix composite materials). The carrier segments 224 and cooling flow inserts 228 are illustratively formed from metallic materials.

In illustrative embodiments, if low pressure cooling air is used to cool a turbine blade track segment (sometimes called a seal segment), and the seal segment fails, hot air may ingress up the low pressure cooling air system, leading to a costly progressive failure. By surrounding a low pressure feed passage 37 with a thin walled tube 28 in a dead headed, high pressure cavity 38, the low pressure system can be protected. In the event that hot air ingresses, the thin walled tube 28 will melt, allowing the high pressure air ($P_H$) to enter the low pressure system preventing the hot air ingress or diluting the hot air to a manageable level. This is a simple, passive system with no moving parts and no parasitic losses that enables a significant SFC advantage via the use of lower pressure (less expensive, cooler) cooling air ($P_L$).

In illustrative embodiments, air from a compressor interstage bleed would be used for cooling the shroud segments 22, 222. This air is generally higher pressure than the gas path pressure at the exit of the turbine stage, but this still allows for the cooling air to be much lower pressure and cooler than if it must be higher pressure than the gas path pressure at the entrance to the turbine stage. Studies have shown there may be a SFC advantage if this lower pressure, lower temperature air source can be used instead of compressor discharge (high pressure) air without encountering any other parasitic penalties.

In illustrative embodiments, the cooling circuit itself may become a potential hot air ingress point if low pressure cooling air is used. Upon a failure in the shroud segment 22, 222, hot air could ingress up the low pressure cooling circuit passages to areas of lower pressure which could lead to progressive failure in the engine 10. A check valve in the cooling circuit may be used prevent hot air from back flowing into the low pressure cooling air system, but could add complexity, cost, and pressure drop (parasitic loss) in the cooling air system. Such a system may depend upon a moving part to close off the back flow of air.

In illustrative embodiments, the low pressure feed passages at some point include a thin walled tube 28 surrounded by a dead-headed, high-pressure cavity 38. In this way, hot air back flowing up the low pressure system would melt the thin walled tube 28, allowing high pressure cooling air ($P_H$) to ingress into the low pressure system. This will either stop the inflow of hot air (but allow high pressure cooling air into the low pressure system) or would dilute the back flowing hot air such that the bulk temperature is reduced to a point that progressive failure is avoided.

In illustrative embodiments, a thin wall tube 28 surrounding a low pressure cooling air supply passage 44 is in turn surrounded by a dead-headed, high-pressure cavity 38. This allows high pressure air ($P_H$) to enter the low pressure system when the thin-walled tube 43 becomes hot enough to melt. Collars 45, 47 at either end of the tube 28 provide sealing of the dead-headed cavity 38 as well as create a pressure balance of the tube 28 with respect to the high pressure cavity 38. An inner end of a cooling air insert 228 may be sealed against a support shaft 262 while the outer end includes spaced platforms 241 and is castellated to allow high pressure air to enter the insert receiver 265 (e.g., the dead-head cavity) while centering the tube 243. In this configuration, the design may include a means to counteract the force due to the high pressure in the dead-headed cavity 265. This could be through the braze joint or by some other mechanical means (such as a stop or plug).

Spacer platforms 41 (sometimes called stand offs) may be provided along the length of the tube 28. These stand offs 41 may be castellated to allow the high pressure air to flow axially along the tube 28. The stand offs provide a means to center the tube 28 in the tube receiver 38 and support the thin-walled tube 43 near a mid span, which may change the natural frequency to address any dynamic issues. The stand offs also provide a means for cross drillings 48 off of the central air passage 44 for the low pressure cooling air system. In some embodiments, these cross drillings are in the form of impingement holes 48. In some embodiments, these cross drillings 246, 248 are to feed the low pressure air into the central drilling 244 and out of the central drilling to the feed distributor 229. These cross-drillings can be sealed at the interface of the stand off and the surrounding component via the interference of the stand off and the bore (this would inherently leak some amount) or by brazing the tube in place (including this particular joint) and subsequently drilling the cross drilling (this would inherently be leak free).

In illustrative embodiments, the tube 28 is brazed in place to provide sealing such that high-pressure air ($P_H$) will not leak into the low pressure system minimizing parasitic losses. The end collars 45, 47 may be brazed in place to prevent leakage. In some embodiments, the stand offs 41 could be brazed in place to improve sealing at the cross-drilling 48 interface. In some embodiments, the bottom end of the cooling flow insert 228 may be brazed in place to avoid leakage and to aid in resisting the high pressure force applied to the thin tube 243. The stand offs 241 could be brazed in place as desired. In some embodiments, the stand offs 41 are fully circumferential and a separate high pressure feed passage is positioned to direct high-pressure air between each stand off 41 and the head 45 and foot 47. In some embodiments, the high-pressure air surrounding the thin-walled tubes 43, 243 may be flowing through an air system and not dead-headed. For example, through flow of high-pressure air could be used to purge a cavity elsewhere in the engine 10.

In illustrative embodiments, the tube 28 could be placed along any passage within the low pressure cooling air supply system. The number of stand offs could be varied from zero to as many as desired. The thin walled tube could have the central air passage as a through hole (44) or only from one end (244) with a cross-drilling for the other entrance/exit. The end collars 45, 47 and stand off 41 diameters could be identical or they could be stepped in diameter so all diameters could be pressed together (interference fit) or seated together (non-interference fit, likely for braze joint) at the same time. In other words, the end collar 47 would not press fit into the entrance of the bore 38 and scrape against the sides all the way down the bore 38, instead it would only engage as all the rest of the stand offs and collars engage, at its final spot. Any resulting high pressure load on the tube may be resisted by a braze joint or by some other mechanical means (stop or plug). In some embodiments, an outer end of the cooling flow insert 228 could extend beyond the support shaft 262 and could contain a shoulder that would sit against the end of the support shaft 262 to resist the pressure load on the thin walled tube 243. The thin walled tube could be used anywhere in the hot section where gas path air would be hot enough to melt metal (potentially burning through cases of the engine).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
   a plurality of carrier segments comprising metallic material and arranged circumferentially adjacent to one another around an axis,
   a plurality of blade track segments comprising ceramic-matrix composite material and arranged circumferentially adjacent to one another around the axis, each blade track segment coupled to one of the carrier segments,
   a plurality of thin-walled tubes each defining an internal cooling air plenum, each thin-walled tube extending into one of the carrier segments and configured to direct a flow of cooling air toward a radially-outward facing side of the blade track segment, and
   a plurality of track-segment couplers, each track-segment coupler coupled to one of the carrier segments and configured to hold one of the blade track segments on the carrier segment,
   wherein each track-segment coupler is configured to receive one of the thin-walled tubes to hold the thin-walled tube in place relative to the carrier segment.

2. The turbine shroud of claim 1, wherein each carrier segment is formed to include a tube receiver configured to receive one of the thin-walled tubes to hold the thin-walled tube in place relative to the carrier segment.

3. The turbine shroud of claim 2, further comprising a head coupled to one end of each thin-walled tube, a foot coupled to an opposing end of each thin-walled tube from the head, and a spacer platform positioned between the head and foot and extending away from an exterior surface of each thin-walled tube.

4. The turbine shroud of claim 3, wherein the head, foot, and spacer platform are configured to seal against the tube receiver and space the thin-walled tube from an interior surface of the tube receiver.

5. The turbine shroud of claim 4, wherein an impingement hole is formed through the spacer platform of each thin-walled tube and is configured to direct the flow of cooling air from the internal cooling air plenum toward the radially-outward facing side of the blade track segment at an angle relative to the radially-outward facing side such that the flow of cooling air is not normal to the radially-outward facing side.

6. The turbine shroud of claim 4, wherein an impingement hole is formed through the spacer platform of each thin-walled tube and is configured to direct the flow of cooling air from the internal cooling air plenum toward the radially-outward facing side of the blade track segment such that the flow of cooling air is generally normal to the radially-outward facing side.

7. The turbine shroud of claim 1, further comprising a first spacer platform extending away from an exterior surface of the thin-walled tube at an outer end thereof and a second spacer platform extending away from an exterior surface of the thin-walled tube at an outer end thereof.

8. The turbine shroud of claim 7, wherein an inlet is formed through the first spacer platform and is configured to direct the flow of cooling air into the internal cooling air plenum, and wherein an outlet is formed through the second spacer platform and is configured to direct the flow of cooling air out of the internal cooling air plenum toward the radially-outward facing side of the blade track segment.

9. The turbine shroud of claim 1, wherein each blade track segment includes a runner and a bridge extending radially outward from and circumferentially along the runner to define an internal cooling cavity between the bridge and the runner.

10. The turbine shroud of claim 9, further comprising a plurality of flow distributors, each flow distributor configured to direct the flow of cooling air toward the radially-outward facing side of one of the blade track segment and extending into the internal cooling cavity of the blade track segment.

11. The turbine shroud of claim 10, wherein each track-segment coupler is configured to engage with one of the flow distributors to hold one of the blade track segments on one of the carrier segments.

12. The turbine shroud of claim 1, wherein each blade track segment includes a runner and at least two attachment features extending radially outward from the runner, the at least two attachment features circumferentially spaced apart from one another and axially extending along the runner.

13. The turbine shroud of claim 12, wherein each thin-walled tube is positioned between the at least two attachment features of a corresponding blade track segment.

14. A turbine shroud segment for use in a gas turbine engine, the turbine shroud segment comprising
    a carrier segment formed to define an internal cavity,
    a blade track segment coupled to the carrier segment to cover an opening into the internal cavity and having an arcuate runner shaped to extend partway around a central axis, and
    a thin-walled tube defining an internal cooling air plenum and extending into the internal cavity of the carrier segment, the thin-walled tube configured to direct a flow of cooling air toward a side of the blade track segment that faces the internal cavity, wherein each carrier segment is formed to include a tube receiver configured to receive one of the thin-walled tubes to hold the thin-walled tube in place relative to the carrier segment, and wherein each thin-walled tube extends axially into the carrier segments through the tube receivers with a tube axis that extends through a void of each thin-walled tube, the tube axis being parallel to the central axis.

15. The turbine shroud of claim 14, further comprising a head coupled to one end of each thin-walled tube, a foot coupled to an opposing end of each thin-walled tube from the head, and a spacer platform positioned between the head and foot and extending away from an exterior surface of each thin-walled tube, wherein the head, foot, and spacer platform are configured to seal against the tube receiver and space the thin-walled tube from an interior surface of the tube receiver.

16. The turbine shroud segment of claim 15, wherein the blade track segment includes at least two attachment posts extending radially outward from the runner into the internal cavity away from the central axis, wherein the at least two attachment posts circumferentially spaced apart from one another around the central axis and axially extending along the central axis, and wherein each cooling flow insert extends axially along the central axis into the internal cavity between the at least two attachment posts of the blade track segment.

17. A turbine shroud segment for use in a gas turbine engine, the turbine shroud segment comprising a carrier segment formed to define an internal cavity, a blade track segment coupled to the carrier segment to cover an opening into the internal cavity, a thin-walled tube defining an internal cooling air plenum and extending into the internal cavity of the carrier segment, the thin-walled tube configured to direct a flow of cooling air toward a side of the blade track segment that faces the internal cavity, and a track-segment coupler and a flow distributor, wherein each blade track segment includes a runner and a bridge extending radially outward from and circumferentially along the runner to define an internal cooling cavity between the bridge and the runner, wherein the flow distributor is configured to direct the flow of cooling air toward the side of one of the blade track segment facing the internal cavity of the carrier segment and extending into the internal cooling cavity of the blade track segment, and wherein the track-segment coupler is configured to engage with the flow distributor to hold the blade track segment on the carrier segment.

18. The turbine shroud of claim 17, further comprising a first spacer platform extending away from an exterior surface of the thin-walled tube at an outer end thereof and a second spacer platform extending away from an exterior surface of the thin-walled tube at an outer end thereof, wherein the track-segment coupler is configured to receive the thin-walled tube to hold the thin-walled tube in place relative to the carrier segment, wherein an inlet is formed through the first spacer platform and is configured to direct the flow of cooling air into the internal cooling air plenum, and wherein an outlet is formed through the second spacer platform and is configured to direct the flow of cooling air out of the internal cooling air plenum to the flow distributor.

* * * * *